US012359494B2

(12) United States Patent
Wolfe et al.

(10) Patent No.: US 12,359,494 B2
(45) Date of Patent: Jul. 15, 2025

(54) AUTOMATIC DOOR WITH A HINGED SWINGING PARTIAL DOOR

(71) Applicant: ASSA ABLOY Entrance Systems AB, Landskrona (SE)

(72) Inventors: Jeffrey Wolfe, Monroe, NC (US); Thomas Epke, Monroe, NC (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 18/227,703

(22) Filed: Jul. 28, 2023

(65) Prior Publication Data

US 2023/0366261 A1 Nov. 16, 2023

Related U.S. Application Data

(63) Continuation of application No. 17/462,159, filed on Aug. 31, 2021, now Pat. No. 11,713,616.

(51) Int. Cl.
*E06B 3/46* (2006.01)
*E05F 15/73* (2015.01)
(Continued)

(52) U.S. Cl.
CPC ............ *E06B 3/4636* (2013.01); *E05F 15/73* (2015.01); *E06B 3/325* (2013.01); *E06B 3/362* (2013.01);
(Continued)

(58) Field of Classification Search
CPC ... E05D 15/58; E05D 15/48; E05Y 2900/132; E05Y 2800/25; E05Y 2800/746;
(Continued)

(56) References Cited

U.S. PATENT DOCUMENTS

| | | | |
|---|---|---|---|
| 445,614 | A | 2/1891 | Mehay |
| 2,205,547 | A | 6/1940 | Stoner |

(Continued)

FOREIGN PATENT DOCUMENTS

| | | | |
|---|---|---|---|
| CN | 110700722 | A | 1/2020 |
| WO | 20180215931 | A1 | 11/2018 |

OTHER PUBLICATIONS https://web.archive.org/web/20210515142937/http://www.tormaxusa.com/en/87/tormax-service-slidingdoors.

(Continued)

*Primary Examiner* — Justin B Rephann
(74) *Attorney, Agent, or Firm* — Burr & Forman LLP

(57) ABSTRACT

A door assembly may include a first sidelite configured to be operably coupled to a first doorjamb, a second sidelite configured to be operably coupled to a second door jamb where the first and second sidelites are disposed in a common plane and define a door opening between the first and second sidelites, a first sliding panel, a second sliding panel where the first and second sliding panels are movable from a closed position disposing the first and second sliding panels to block access through the door opening and an open position in which the first sliding panel is proximate the first sidelite and the second sliding panel is proximate the second sidelite, a first partial door panel, and a second partial door panel. The first and second sliding panels are disposed in a second plane parallel to the common plane in both the open and closed position. The first and second partial door panels are operably coupled to the first and second sidelites, respectively, via hinge assemblies. The first and second partial door panels have a closed state in which the first and second partial door panels are each disposed in the common plane blocking access through the door opening, and an open state
(Continued)

in which the first and second partial door panels are each disposed out of the common plane.

19 Claims, 10 Drawing Sheets

(51) Int. Cl.
*E06B 3/32* (2006.01)
*E06B 3/36* (2006.01)
*E06B 3/50* (2006.01)
*E06B 7/32* (2006.01)

(52) U.S. Cl.
CPC .............. *E06B 3/5081* (2013.01); *E06B 7/32* (2013.01); *E05Y 2900/132* (2013.01)

(58) Field of Classification Search
CPC . E06B 7/32; E06B 1/524; E06B 3/362; E06B 3/4636; E06B 3/5081; E06B 3/325; E05C 17/56; E05F 15/73
See application file for complete search history.

(56) References Cited

U.S. PATENT DOCUMENTS

| | | | |
|---|---|---|---|
| 3,266,189 | A | 8/1966 | Eby |
| 3,318,047 | A | 5/1967 | Carson |
| 3,325,941 | A | 6/1967 | Prucha |
| 3,583,738 | A | 6/1971 | Uphoff et al. |
| 3,834,081 | A | 9/1974 | Catlett |
| 4,063,388 | A | 12/1977 | Little |
| 4,438,594 | A | 3/1984 | Bunzl |
| 5,486,026 | A | 1/1996 | Borgardt |
| 5,762,123 | A | 6/1998 | Kuyama et al. |
| 5,884,683 | A | 3/1999 | Sears |
| 6,422,287 | B1 | 7/2002 | Wilke |
| 6,490,832 | B1 * | 12/2002 | Fischbach ............ E05F 15/643 52/207 |
| 7,296,608 | B2 | 11/2007 | Weishar et al. |
| 9,637,970 | B1 | 5/2017 | Rendon et al. |
| 10,280,678 | B1 | 5/2019 | Rendon, Jr. et al. |
| 2001/0025450 | A1 | 10/2001 | Juntunen et al. |
| 2004/0025455 | A1 | 2/2004 | Nubel et al. |
| 2004/0160318 | A1 | 8/2004 | Sasaki et al. |
| 2005/0028946 | A1 | 2/2005 | Weishar et al. |
| 2005/0120631 | A1 | 6/2005 | Sanders |
| 2006/0150512 | A1 | 7/2006 | Heithe et al. |
| 2007/0261201 | A1 * | 11/2007 | Baer ....................... E05D 3/122 16/236 |
| 2009/0165508 | A1 * | 7/2009 | Sprague .............. E05B 65/0025 70/91 |
| 2010/0242366 | A1 | 9/2010 | Liebscher et al. |
| 2011/0072724 | A1 | 3/2011 | Scruggs |
| 2011/0214350 | A1 | 9/2011 | Salvietti et al. |
| 2012/0117881 | A1 | 5/2012 | Seymour et al. |
| 2012/0159851 | A1 | 6/2012 | Seymour et al. |
| 2014/0352220 | A1 | 12/2014 | Rees |
| 2016/0356078 | A1 | 12/2016 | Macaraeg |
| 2017/0211300 | A1 * | 7/2017 | Fehr ...................... E05B 65/087 |
| 2017/0275936 | A1 | 9/2017 | Wolfe |
| 2019/0360200 | A1 | 11/2019 | Sloss |
| 2019/0360260 | A1 | 11/2019 | Hunter |

OTHER PUBLICATIONS https://web.archive.org/web/20210625085555/https://www.fsrmagazine.com/content/tormax-createsspecially-engineered-sliding-door-systems.
https://www.facebook.com/watch/?v=816923339009783.
https://foursquare.com/v/chickfila/4ba42979f964a520e58738e3?openPhotoId=60d7ceda9bd21a6665bb1c13.
English Translation for CN 110700722.
International Search Report and Written Opinion of corresponding International Application No. PCT/EP2022/074091 mailed Nov. 28, 2022, all pages cited in its entirety.
Signed and stamped engineering drawings entitled "Pass Through Gate Chick Fil-A" dated Dec. 2, 2020.
Signed and stamped engineering drawings entitled "Pass Through Gate Chick Fil-A" dated Jan. 2, 2020.
An email dated Nov. 3, 2017 from Tormax to Chick-Fil-A that attaches a drawing of the TX9300 Chick-Fil-A Prototype.
A Proposal dated Apr. 26, 2019 from Tormax to Chick-Fil-A.
A completion form and photographs of a Tormax door dated Feb. 18, 2021.

* cited by examiner

AUTOMATIC DOOR WITH A HINGED SWINGING PARTIAL DOOR

CROSS-REFERENCE TO RELATED APPLICATIONS

This application is a continuation of U.S. application Ser. No. 17/462,159, filed on Aug. 31, 2021. The entire contents of above are incorporated herein by reference.

TECHNICAL FIELD

Example embodiments generally relate to automatic doors and, in particular, relate to an automatic door with a hinged swinging partial door integrated therewith.

BACKGROUND

Automatic sliding doors are used in commercial and non-commercial settings in order to allow people and things to enter and exit a given area without having to open and close the door manually. Some sliding doors incorporate multiple panels, some of which may be fixed, while others slide to respectively open and close the door. In one common arrangement, a pair of fixed panels may lie in a common plane and be spaced apart from each other to define an opening in the common plane. Meanwhile, this pair of fixed panels may be located proximate to the left and right door jambs, respectively. A pair of sliding (or telescoping) panels may be aligned adjacent to, and in a plane (or planes) parallel to, the fixed panels when fully retracted. The sliding panels may then slide out of alignment with the fixed panels toward each other. When the sliding panels contact each other, the opening in the common plane of the fixed panels may be blocked by the sliding panels.

A sensor may be positioned on the inside and outside of the door (e.g., above the opening) to trigger powered operation (i.e., sliding) of the sliding panels responsive to detection of an individual or equipment approaching the door. In some cases, when the sliding panels are fully retracted, the fixed and sliding panels on each side may also hingedly open by swinging out of the common plane about hinges that operably couple the fixed panels to the left and right door jambs, respectively. This movement is typically manual, and is referred to as full breakout (and the preceding a fixed sidelite). Full breakout may enable the door to provide an egress or ingress space that extends fully between the left and right door jambs (instead of merely having a width defined by the opening between the fixed panels).

The doors described above are very popular, and have significant utility as a main entryway for a commercial or industrial business application, or for hospitals and other facilities. However, it may be desirable to modify this basic structure to adapt the door for other applications in other settings.

BRIEF SUMMARY OF SOME EXAMPLES

In an example embodiment, a door assembly may be provided. The door assembly may include a first sidelite configured to be operably coupled to a first door jamb, a second sidelite configured to be operably coupled to a second door jamb where the first and second sidelites are disposed in a common plane and define a door opening between the first and second sidelites, a first sliding panel, a second sliding panel where the first and second sliding panels may be movable from a closed position disposing the first and second sliding panels to block access through the door opening and an open position in which the first sliding panel is proximate the first sidelite and the second sliding panel is proximate the second sidelite, a first partial door panel, and a second partial door panel. The first and second sliding panels may be disposed in a second plane parallel to the common plane in both the open and closed position. The first and second partial door panels may be operably coupled to the first and second sidelites, respectively, via hinge assemblies. The first and second partial door panels may have a closed state in which the first and second partial door panels are each disposed in the common plane blocking access through the door opening, and an open state in which the first and second partial door panels are each disposed outside the common plane.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 1:
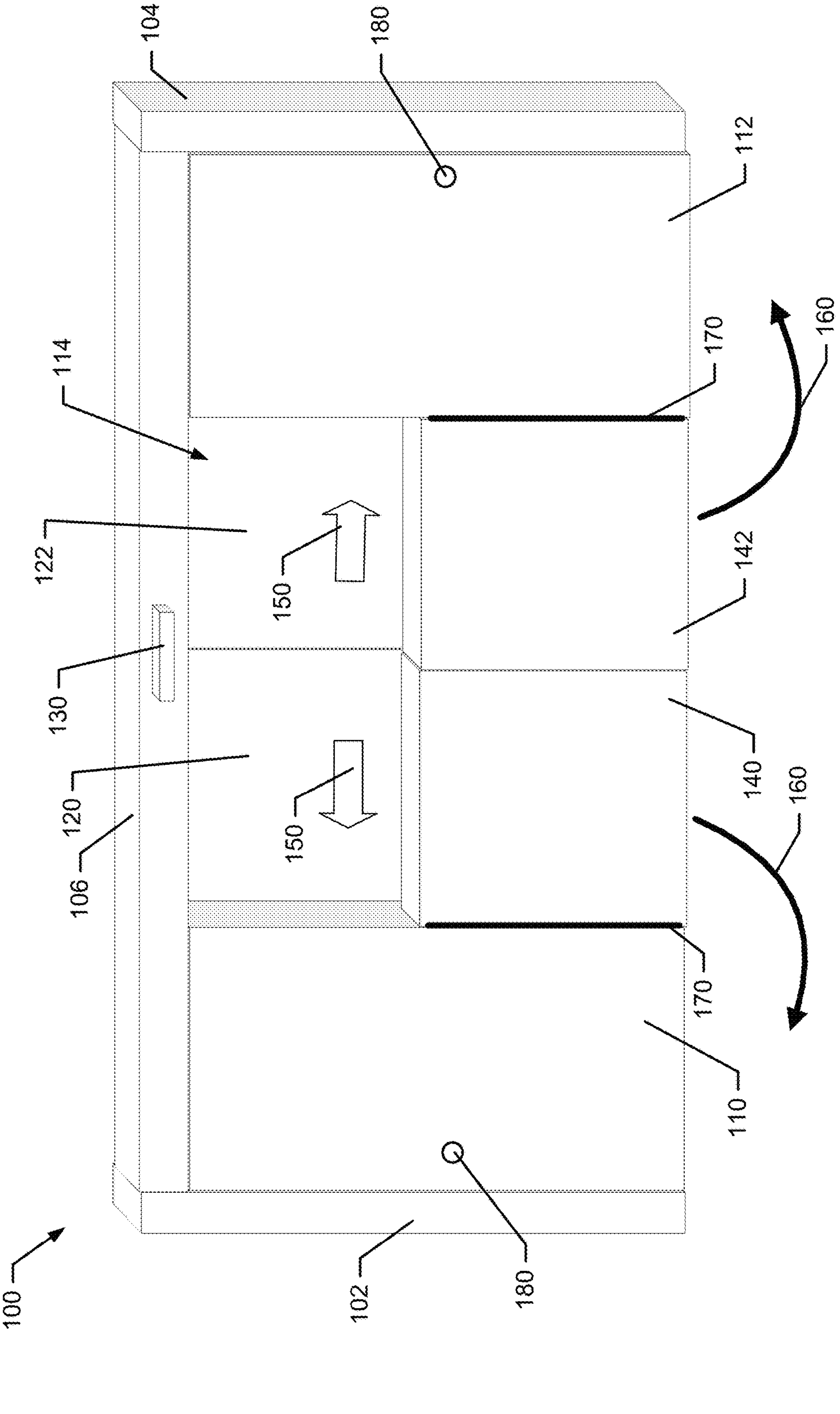
FIG. 1 illustrates an external perspective view of a door assembly in a closed position, and including a partial door assembly in a closed state in accordance with an example embodiment.
Figure 6:
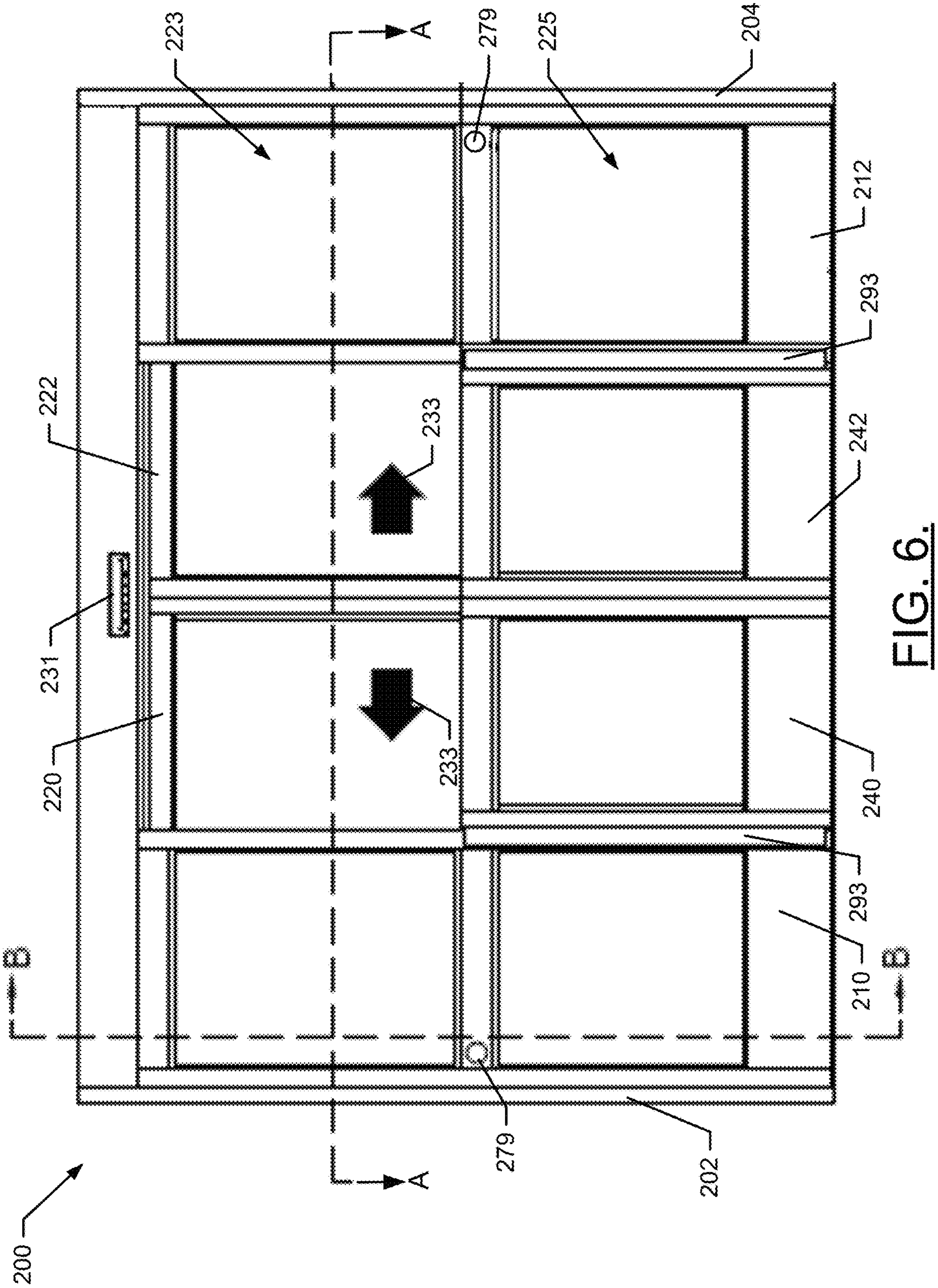
FIG. 6 illustrates an external elevation view of the door assembly, and shows lines A-A and B-B along which cross section views may be taken in accordance with an example embodiment.
Figure 8:
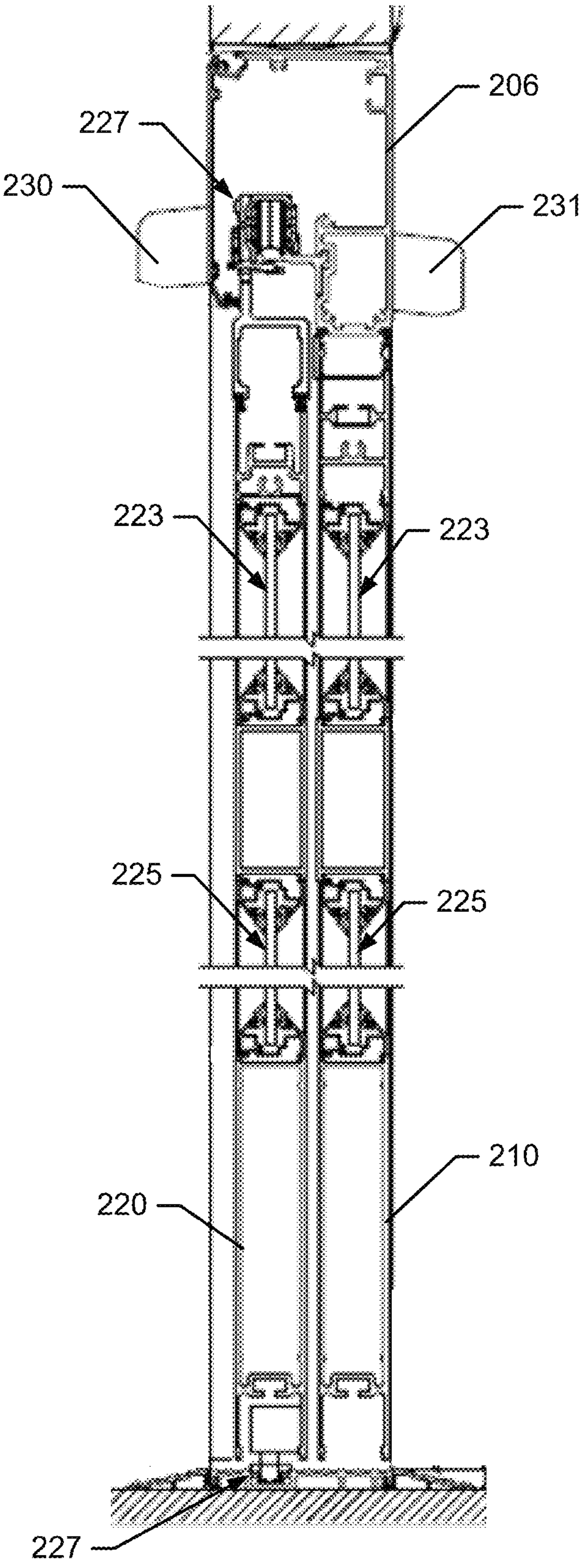
Figure 9:
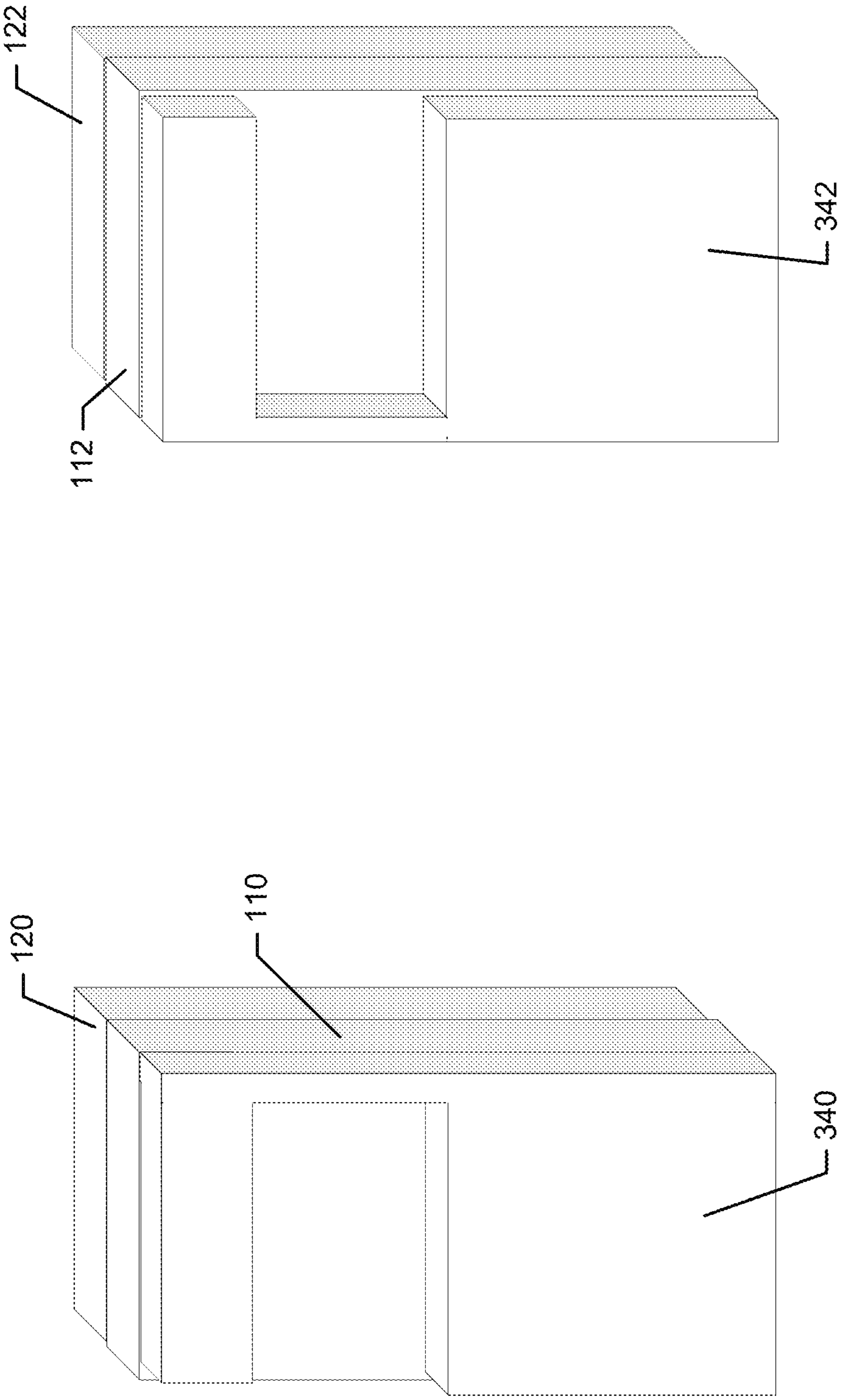
Figure 10:
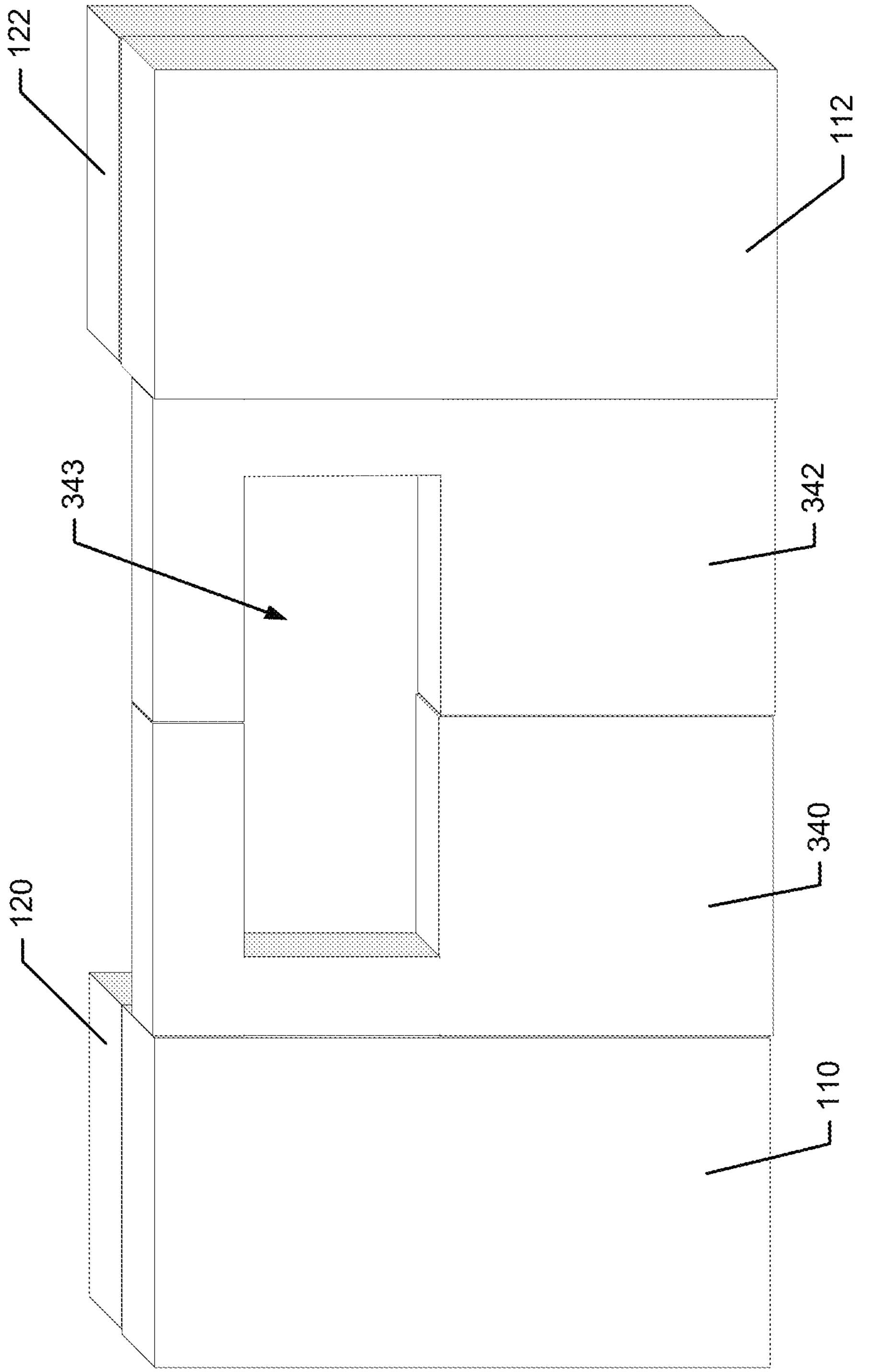

FIG. 8 illustrates a cross section view of the door assembly of FIG. 6 along line B-B in accordance with an example embodiment; and FIG. 9 illustrates a perspective view of the door assembly of FIG. 1 with an alternative structure for the partial door assembly in accordance with an example embodiment; and FIG. 10 illustrates a perspective view of the door assembly of FIG. 1 with an alternative structure for the partial door assembly in a closed position in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, it may be desirable to modify a typical automatic door that provides a main entryway to enable the door to be used for other purposes. One such modification may include the provision of a partial door assembly, which may be a half door assembly in some cases. For example, the partial door assembly could be provided to close off the bottom half of the common opening otherwise defined between the fixed panels. With the partial door assembly in the opened position, the fixed and sliding door panels may function as described above to permit automatic operation of the sliding door panels to provide ingress or egress via the full area of the common opening. However, with the partial door assembly in the closed position, the bottom half of the common opening may be blocked by the partial door assembly. In this configuration, the top portion of the common opening may be automatically opened and closed to essentially define an automatically operable window.

Although other uses may also be possible, one convenient usage for the arrangement described above may be as a quick service window for a restaurant or other business enterprise where passage of goods from inside the business enterprise to customers outside the automatically operable window that results may be accomplished. When the partial door assembly is closed, the automatically operable window function may be employed. However, if it is desirable to instead utilize the full opening, the partial door assembly may be opened thereby restoring normal automatic door operation.

As can be appreciated from the description above, implementation of the partial door assembly could likely be accomplished by a number of different methods. For example, the partial door assembly could be implemented via sliding partial doors that lie in a third plane adjacent the plane of the fixed panels and opposite the plane of the sliding panels (relative to the fixed panels). However, this arrangement creates a large void space between the sliding partial doors and the sliding panels of the automatic door. This void space may collect debris of all sorts, which may be unsightly, increase cleaning requirements, or even cause increased maintenance and repair activity. Moreover, the provision of the sliding partial doors in a separate and third plane also presents an appearance to external viewers that is generally not aesthetically pleasing.

Accordingly, a design that is both aesthetically pleasing and also functionally and structurally superior may be preferable. FIGS. 1-4 illustrate a schematic representation of components associated with an example of such a door design in multiple configurations. In this regard, FIG. 1 illustrates an external perspective view of a door assembly 100 of an example embodiment. The door assembly 100 includes a first door jamb 102, a second door jamb 104, and an upper frame member 106 that combine to define a door frame for the door assembly 100. Although the door assembly 100 can be scaled to any desirable size, a common width and height for the door frame may be about 84 inches and 92 inches, respectively.

A first fixed pane or first sidelite 110 may be operably coupled to the first door jamb 102, and a second fixed pane or second sidelite 112 may be operably coupled to the second door jamb 104. As noted above, the size of the first and second sidelites 110 and 112 may vary. However, in an example embodiment, each of the first and second sidelites 110 and 112 may have a width of about 21 to 22 inches, and a height of about 84 inches. The first and second sidelites 110 and 112 may normally be latched or fixed in the position shown in FIG. 1. In such position, each of the first and second sidelites 110 and 112 may be in a common plane. A space provided between the first and second sidelites 110 and 112 may form a door opening 114 having a width of about 40 to 42 inches. The door opening 114 also lies in the common plane.

The door assembly 100 may further include a first sliding panel 120 and a second sliding panel 122. The door assembly 100 also includes a partial door assembly that includes a first partial door panel 140 and a second partial door panel 142, which will be described in greater detail below. The first and second sliding panels 120 and 122 may be operably coupled to an electronically controllable motor assembly, or other motive assembly capable of providing power for movement of the first and second sliding panels 120 and 122. In an example embodiment, the motor assembly may be operably coupled to sensor 130, which may detect motion and, responsive to detection of such motion, trigger the motor assembly to cause movement of the sliding panels from the closed position shown in FIG. 1 to an open position shown in FIG. 2.

Figure 2:
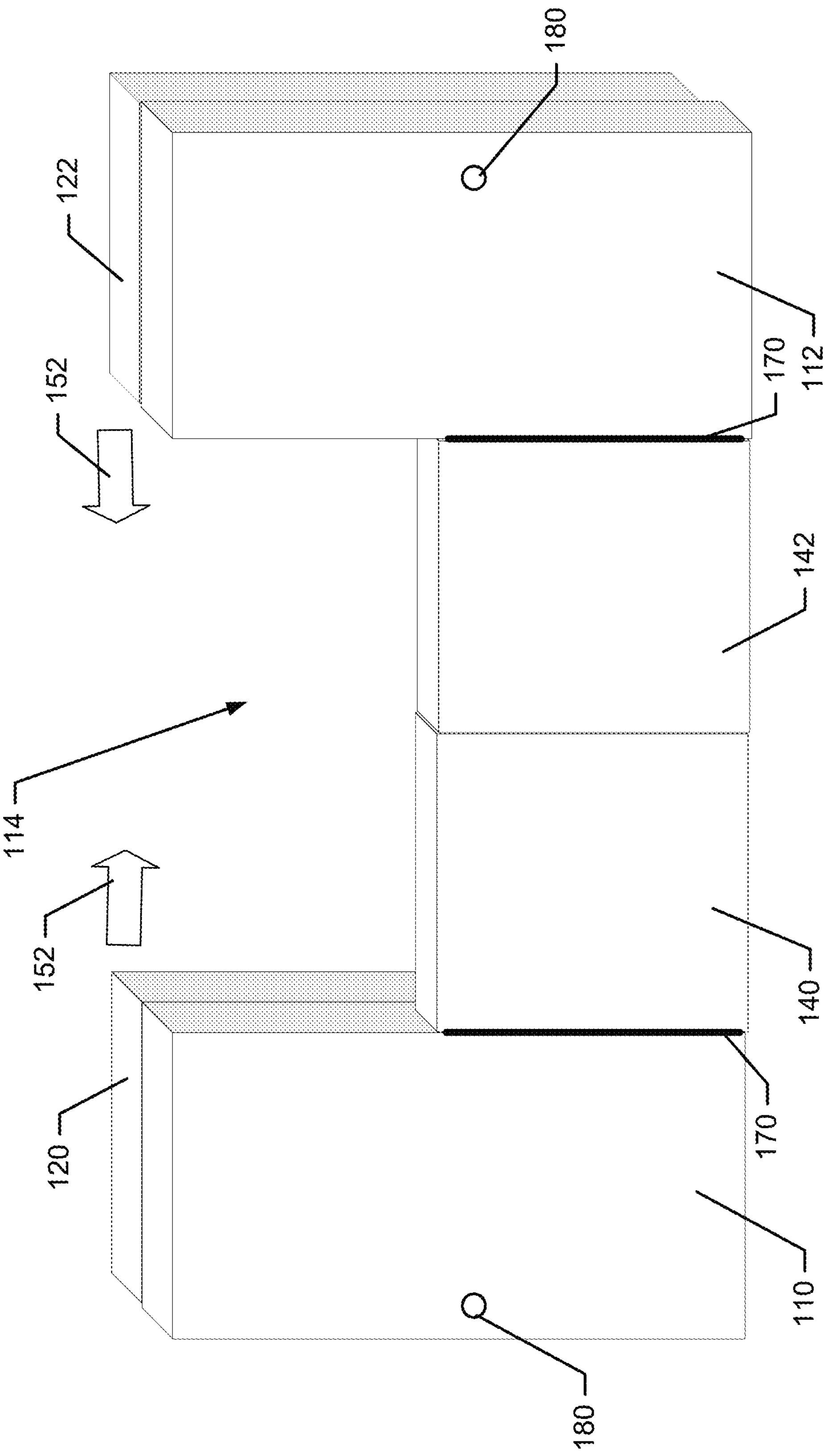
FIG. 2 shows a perspective view of the door assembly of FIG. 1 with framing removed, and showing first and second sliding panels in the open position while the partial door assembly remains in the closed state according to an example embodiment.

FIG. 2 shows a perspective view of the door assembly 100 of FIG. 1 with the first and second sliding panels 120 and 122 in the open position. In FIG. 2, the first and second door jambs 102 and 104 and the upper frame member 106 have been removed to provide a better view of the relationship between the first and second sliding panels 120 and 122 and the first and second sidelites 110 and 112. In this regard, the first and second sliding panels 120 and 122 may be retained by a retention assembly such as, for example, a track, guide rail and/or other movement guidance features that define a predetermined path for travel of the first and second sliding panels 120 and 122 during movement thereof. In this regard, the retention assembly of the first and second sliding panels 120 and 122 may enable the first and second sliding panels 120 and 122 to be moved between the open position (of FIG. 2) and the closed position (of FIG. 1) responsive to operation of the motor assembly along the predetermined path. Components of the retention assembly may be provided in the upper frame member 106 and/or at the floor disposed below the first and second sliding panels 120 and 122.

As can be appreciated from FIGS. 1 and 2, the first and second sliding panels 120 and 122 may lie in a second plane that is adjacent to and parallel to the common plane in which the first and second sidelites 110 and 112 are normally retained. Moreover, while in the closed position of FIG. 1, the open position of FIG. 2, and during movement between the open and closed positions, the retention assembly retains the first and second sliding panels 120 and 122 in the second plane.

The first and second sliding panels 120 and 122 may have similar dimensions to those of the first and second sidelites 110 and 112, such that when in the open position of FIG. 2, the first sliding panel 120 becomes substantially aligned with the first sidelite 110 and the second sliding panel 122 becomes substantially aligned with the second sidelite 112. In this regard, corresponding edges (e.g., inner and outer edges as determined relative to proximity to the door opening 114) of the first and second sliding panels 120 and 122 and the first and second sidelites 110 and 112, respectively, may be aligned with each other. Meanwhile, when in the closed position of FIG. 1, the outer edge of the first and second sliding panels 120 and 122 may be substantially aligned with the inner edges of the first and second sidelites 110 and 112, respectively. At the same time, the inner edges of the first and second sliding panels 120 and 122 may meet each other at a center of the door opening 114 as shown in FIG. 1.

Thus, for example, the first and second sliding panels 120 and 122 may move the direction of arrows 150 in FIG. 1 away from each other to move the first and second sliding panels 120 and 122 to the position shown in FIG. 2. The first and second sliding panels 120 and 122 may then move toward each other as shown by arrows 152 in FIG. 2 to return to the closed position shown in FIG. 1. Movement of the first and second sliding panels 120 and 122 in either the direction of arrows 150 or 152 is powered by the motor assembly, and is limited by the retention assembly to retain the first and second sliding panels 120 and 122 in the second plane. Although outside the scope of the present disclosure, it should be appreciated that the first and second sliding panels 120 and 122 may be locked in the closed position by a lock assembly or various latching apparatuses. The lock assembly or latching apparatuses may affix the first and second sliding panels 120 and 122 to each other, to the upper frame member 106, to the floor, or to any other suitable structure of the door assembly 100 or the environment proximate thereto.

The operation of the first and second sliding panels 120 and 122 is typically automated based on detection of motion (e.g., by the sensor 130) of an object or individual approaching the door assembly 100. Notably, although the sensor 130 is shown on the external or outside of the door assembly 100 there is typically another instance of the sensor 130 disposed on the upper frame member 106 on the internal side or inside of the door assembly 100 as well. Thus, objects or individuals approaching the door assembly 100 from either direction can be expected to trigger automatic (and simultaneous) operation of the first and second sliding panels 120 and 122 to transition the first and second sliding panels 120 and 122 to the open position. After a time delay, and assuming no further motion is detected, the first and second sliding panels 120 and 122 may return to the closed position. This automatic operation described above may provide a convenient and efficient way to manage ingress and egress from a building or business.

Although this paradigm for door operation at a building or business may be familiar for use as a primary mechanism by which customers enter and exit a business, modification of the door assembly 100 may upgrade the door assembly 100 to configure the door assembly 100 for still other uses or functions. For example, by providing the partial door assembly noted above, the door assembly 100 may be configured to resemble an automated drive up or quick service window. In this regard, the door assembly 100 may appear as shown in FIG. 1 when no vehicle or customer has approached the external side of the door assembly 100 (to trigger the sensor 130). However, when a vehicle or customer approaches the door assembly 100, the first and second sliding panels 120 and 122 may automatically open to the position of FIG. 2, and the customer may be provided with goods, items, or services through the portion of the door opening 114 that remains unobstructed by (and above) the first and second partial door panels 140 and 142 of the partial door assembly.

Figure 3:
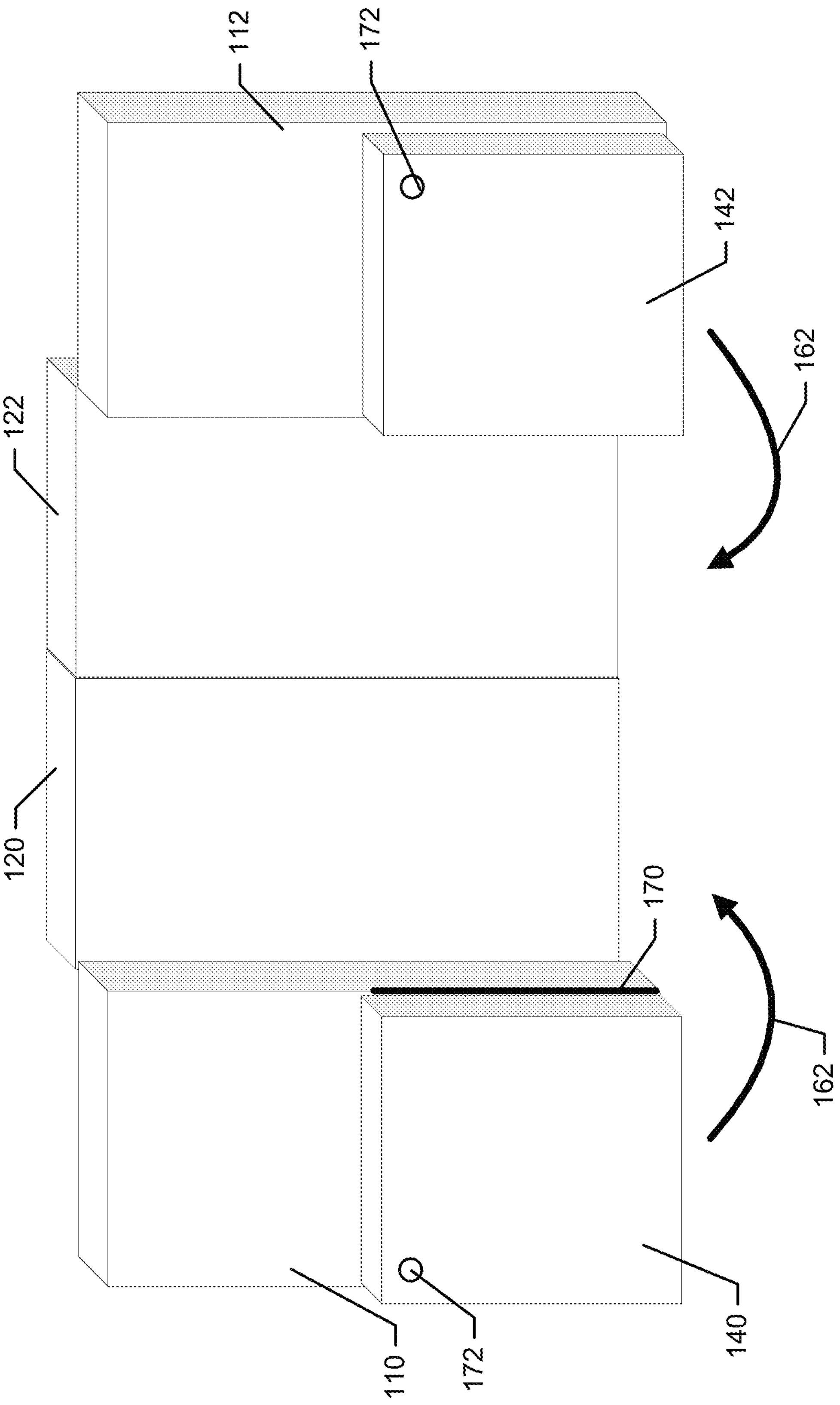
FIG. 3 shows a perspective view of the door assembly of FIG. 1 with framing removed, and showing first and second sliding panels in the closed position while the partial door assembly is in an open state according to an example embodiment.
Figure 4:
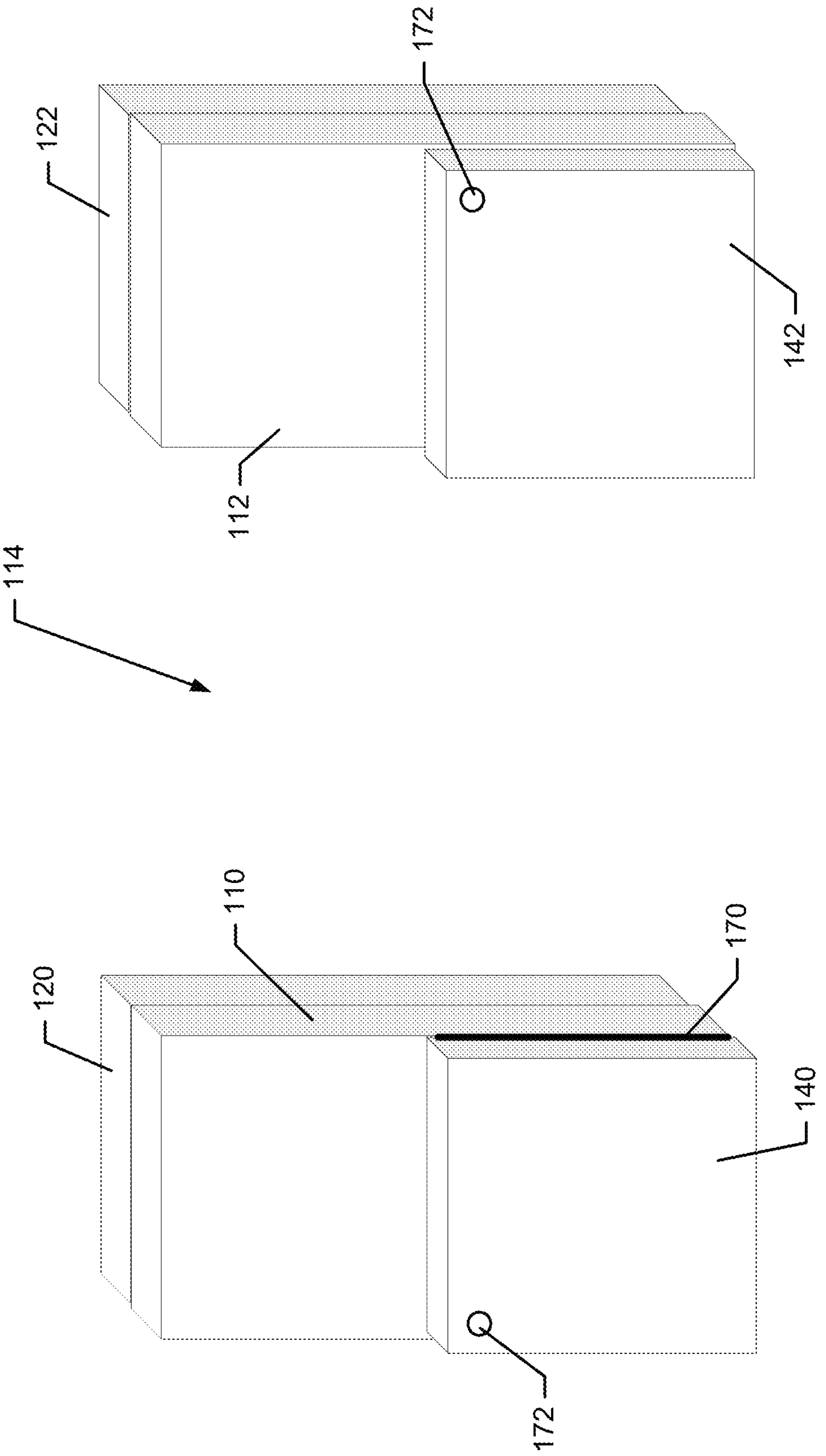
FIG. 4 shows a perspective view of the door assembly of FIG. 1 with framing removed, and showing first and second sliding panels in the open position while the partial door assembly remains in the open state according to an example embodiment.

Meanwhile, the partial door assembly may also be operable to convert the drive up or quick service configuration shown in FIGS. 1 and 2 to an automated ingress/egress door configuration shown in FIGS. 3 and 4. As can be appreciated from FIGS. 1-4, the opening and closing of the partial door assembly affects the change in configuration between the drive up or quick service configuration and the automated ingress/egress door configuration. In this regard, arrows 160 of FIG. 1 illustrate motion that may be induced on the first and second partial door panels 140 and 142 to transition the first and second partial door panels 140 and 142 to the open position shown in FIG. 3. Thus, the first and second partial door panels 140 and 142 may be moved from the open position of FIG. 3 along a path as shown by arrows 162 in FIG. 3 to the position shown in FIG. 1.

The movement of the first and second partial door panels 140 and 142 may be provided via manual swinging of the first and second partial door panels 140 and 142 about a hinge assembly 170. In an example embodiment, one instance of the hinge assembly 170 may be provided in the form of a continuous hinge that is disposed at an intersection of the first partial door panel 140 with the first sidelite 110, and another instance of the hinge assembly 170 may be provided as a continuous hinge that is disposed at an intersection of the second partial door panel 142 with the second sidelite 112. In particular, a pivot axis of the hinge assembly 170 may be disposed at an external outer edge of the first and second partial door panels 140 and 142 and at an external inner edge of the first and second sidelites 110 and 112. In this context, external refers to the external or internal perspective of the business or building in which the door assembly 100 is mounted, and inner and outer edges are considered relative to the center of the door opening 114. Thus, the pivot axes may be disposed at an intersection of externally facing front faces of the first and second sidelites and the first and second partial door panels. In some cases, the "front faces" of the first and second sidelites 110 and 112 and the first and second partial door panels 140 and 142 may therefore lie substantially in a same plane and be flush or substantially flush relative to each other to present an appealing aesthetic appearance.

The use of a continuous hinge may provide robustness to the first and second partial door panels 140 and 142 (e.g., to support the weight of a worker leaning thereon). Moreover, the placement of the hinge assembly 170 as shown and described enables the first and second partial door panels 140 and 142 to rotate between a closed position in which the first and second partial door panels 140 and 142 are located in the common plane of the first and second sidelites 110 and 112 and an open position in which the first and second partial door panels 140 and 142 are substantially aligned with the first and second sidelite panels 110 and 112, respectively, and are also located in a third plane. The third plane is adjacent to and parallel to the common plane. Moreover, the third plane is also parallel to the second plane, and is opposite the second plane relative to the common plane.

The fact that the first and second partial door panels 140 and 142 are in the common plane in the closed position (see FIGS. 1 and 2) is significant for multiple reasons. First, as can be seen from FIGS. 1 and 2, an outer face of the first and second partial door panels 140 and 142 may lie in a same plane as an outer face of the first and second sidelites 110 and 112 in order to present a uniform and aesthetically pleasing outward appearance. This uniformity is highly preferable for food and other vendors since it presents (and reinforces) a brand quality message by itself, and is also easy to clean and maintain with respect to outward appearances. This positioning is also advantageous since all lateral edges of the first and second partial door panels 140 and 142 are supported by adjacent structure. This support structure enables the first and second partial door panels 140 and 142 to have a robust look and feel, but also ensures significant weight bearing capabilities for the first and second partial door panels 140 and 142. Not only are the lateral edges of the first and second partial door panels 140 and 142 that touch (or nearly touch) each other mutually supporting, but the opposite lateral edges are mutually supported by the outer lateral edges of the corresponding first and second sidelites 110 and 112. Another advantage of this positioning is that the space formed between the first and second partial door panels 140 and 142 and the first and second sliding panels 120 and 122, respectively, is minimized. In this regard, instead of forming a big gap therebetween, into which debris, water, or even animals may collect or become trapped, the small gap again provides an improved appearance and also prevents collection of foreign articles.

In an example embodiment, one or both of the first and second partial door panels 140 and 142 may include a lock assembly 172 as shown in FIGS. 3 and 4. The lock assembly 172 may be embodied as a flush mounted cylinder lock (which may operate a flush mounted bolt). The lock assembly 172 may therefore be mounted on an internal side of the first and second partial door panels 140 and 142 so as to not be visible (or operable) externally when the partial door assembly is in the closed position. The fact that the cylinder lock is flush mounted may not only present an aesthetically pleasing appearance from the internal side of the door assembly 100, but may also permit the space between the first and second partial door panels 140 and 142 and the first and second sliding panels 120 and 122 to be relatively small, thereby further supporting the advantages noted above with respect to minimization of the gap therebetween. In some cases, the lock assembly 172 may further be adapted to lock the first and second partial door panels 140 and 142 in the open position as well.

The fact that the first and second partial door panels 140 and 142 are in a third plane, which is parallel to the common plane, in the open position is also helpful for multiple reasons. In this regard, for example, the first and second partial door panels 140 and 142 can be moved entirely out of the door opening 114 to maximize the width of the door opening 114 as shown in FIGS. 3 and 4. Additionally, as shown in FIG. 3, a latch 180 may be provided on the first and second sidelites 110 and 112 to retain the first and second partial door panels 140 and 142 in the third plane (i.e., in the open position). The latch 180 may be a magnet latch that magnetically attracts the first and second partial door panels 140 and 142 in cases where the first and second partial door panels 140 and 142 are made of steel or other ferrous metals. However, in some examples, the latch 180 may include a mechanical latch that interfaces with a bracket or other component disposed on the first and second partial door panels 140 and 142 that can be retained by the latch 180.

The transition from the configuration of FIG. 1 to that of FIG. 2 should then be appreciated to be an automated transition that occurs responsive to motion at the sensor 130 (or at a similar sensor located on the internal side of the door assembly 100). Meanwhile, the transition from the configuration of FIG. 1 to that of FIG. 3 is accomplished by manually swinging the first and second partial door panels 140 and 142 to the open position. While the first and second partial door panels 140 and 142 are in the open position, as shown in FIG. 3, any motion detected (inside or outside the door assembly 100) may cause an automatic transition to the configuration shown in FIG. 4. Transitions opposite those described above are also possible, as can be easily appreciated by one of skill in the art.

Figure 5:
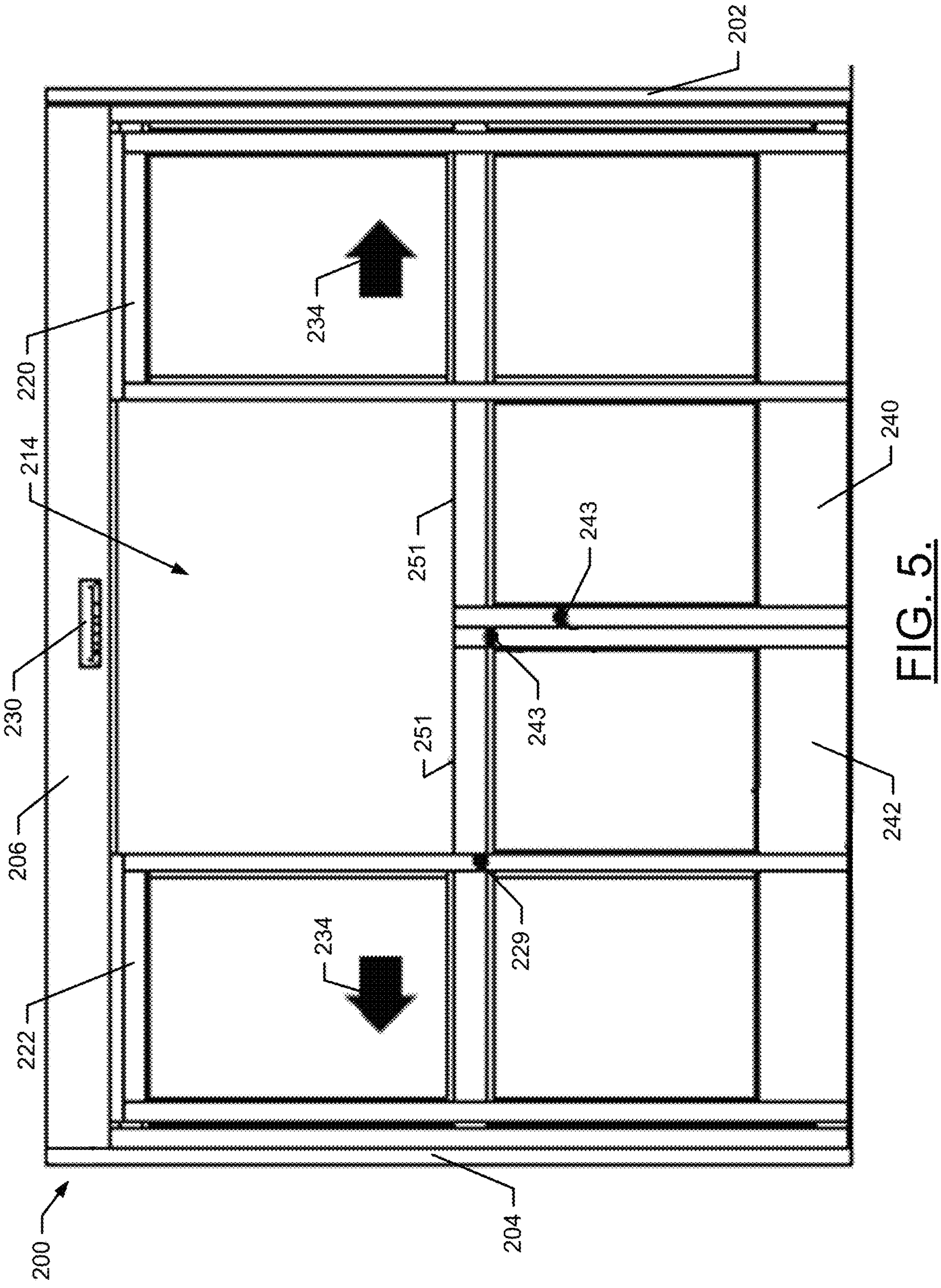
FIG. 5 illustrates an internal elevation view of a door assembly of an example embodiment.
Figure 7:
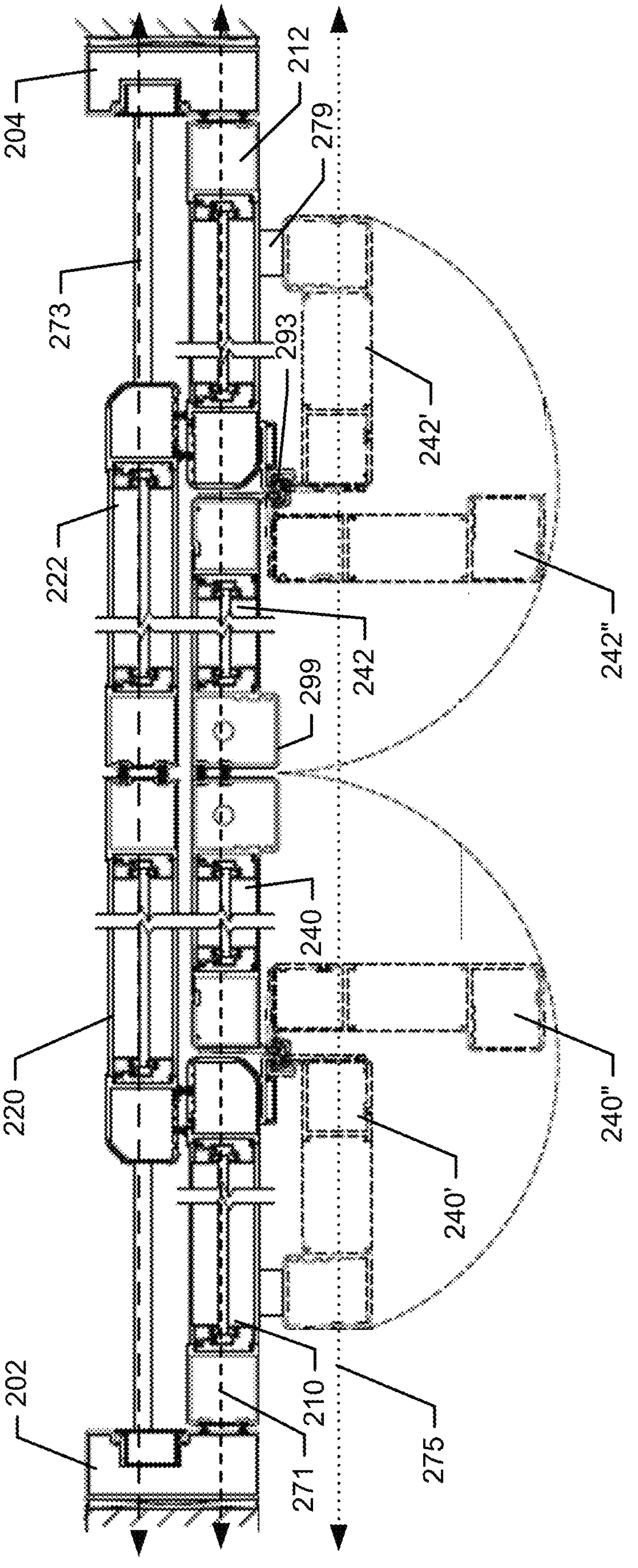
FIG. 7 illustrates a cross section view of the door assembly of FIG. 6 along line A-A in accordance with an example embodiment.

As noted above, the examples of FIGS. 1-4 are schematic in nature, and thus are neither to scale, nor necessarily representative of shapes and sizes of components represented. FIGS. 5-8 illustrate another example embodiment in which style elements and other aesthetic features that may be employed are demonstrated by way of example and not of limitation. In this regard, FIG. 5 illustrates an internal elevation view of a door assembly 200 of an example embodiment. FIG. 6 illustrates an external elevation view of the door assembly 200, and shows lines A-A and B-B along which cross section views may be taken, and such cross section views are shown in FIGS. 7 and 8, respectively. Of note, FIGS. 7 and 8 include breaks in various portions of the door assembly 200 components to facilitate fitting the components shown on the page. The components of FIGS. 5-8 are examples of specific structures that may be used to embody the door assembly 100 described above in reference to FIGS. 1-4.

Referring now to FIGS. 5-8, the door assembly 200 includes a first door jamb 202, a second door jamb 204, and an upper frame member 206 that combine to define a door frame for the door assembly 200. The door assembly 200 further includes a first sidelite 210 that may be operably coupled to the first door jamb 202, and a second sidelite 212 that may be operably coupled to the second door jamb 204. The first and second sidelites 210 and 212 may normally be latched or fixed in the position shown in FIG. 5, and may each lie in a common plane. The space provided between the first and second sidelites 210 and 212 may form a door opening 214 that also lies in the common plane.

Although the first and second sidelites 210 and 212 are normally fixed in the common plane, they may capable of being swung open out of the common plane in some cases. In this regard, for example, the operable coupling between the sidelites and door jambs may be provided via a respective hinge assembly on each side to enable either or both of the first and second sidelites 210 and 212 to be opened. In such examples, the hinge assembly may enable either or both of the first and second sidelites 210 and 212 to be swung from the closed (normal) position shown in FIG. 5 to an opened position (not shown) in which condition very large equipment, or larger groups of people, may be moved in or out through the door assembly 200.

The door assembly 200 may further include a first sliding panel 220, a second sliding panel 222, and a partial door assembly including a first partial door panel 240 and a second partial door panel 242. In the example depicted, the first and second sliding panels 220 and 222 and the first and second sidelites 210 and 212 may each have a transparent sub-panel 223 and an opaque sub-panel 225 disposed therein. In the depicted example, the transparent sub-panels 223 may be disposed on a top half of each of the first and second sliding panels 220 and 222 and the first and second sidelites 210 and 212. Meanwhile, the opaque sub-panel 225 may be disposed on a bottom half of each of the first and second sliding panels 220 and 222 and the first and second sidelites 210 and 212. The first and second partial door panels 240 and 242 may each include a single opaque sub panel that substantially matches the size, shape and coloration provided for the opaque sub panels 225 of each of the first and second sliding panels 220 and 222 and the first and second sidelites 210 and 212.

The first and second sliding panels 220 and 222 may be operably coupled to an electronically controllable motor assembly, or other motive assembly capable of providing power for movement of the first and second sliding panels 220 and 222. In an example embodiment, the motor assembly may be operably coupled to a first sensor 230, which may be disposed on the internal side of the upper frame member 206, and a second sensor 231, which may be disposed on the external side of the upper frame member 206. Both the first and second sensors 230 and 231 may detect motion and, responsive to detection of such motion, trigger the motor assembly to cause movement of the first and second sliding panels 220 and 222 from the closed position shown in FIG. 6 to an open position shown in FIG. 5. The arrows 233 in FIG. 6 show the direction of movement of the first and second sliding panels 220 and 222 prior to such movement, and the arrows 234 of FIG. 5 show the direction that the now repositioned first and second sliding panels 220 and 222 have undergone to move to the location depicted.

FIG. 7 shows a cross section view of the door assembly 200 of FIG. 6 taken along line A-A, while FIG. 8 shows a cross section view of the door assembly 200 of FIG. 6 taken along line B-B. Referring to FIG. 8, with the first and second sliding panels 220 and 222 may be retained by a retention assembly 227 that includes track, guide rail and pin components that define a predetermined path for travel of the first and second sliding panels 220 and 222 during movement thereof. In this regard, the retention assembly 227 enables the first and second sliding panels 220 and 222 to be moved between the open position (of FIG. 5) and the closed position (of FIG. 6) responsive to operation of the motor assembly along the predetermined path.

As can be appreciated from FIGS. 5-8, the first and second sliding panels 220 and 222 lie in a second plane that is adjacent to and parallel to the common plane in which the first and second sidelites 210 and 212 are normally retained. Moreover, while in the closed position of FIG. 6, the open position of FIG. 5, and during movement between the open and closed positions, the retention assembly 227 retains the first and second sliding panels 120 and 122 in the second plane.

As shown in FIG. 5, one or both of the first and second sliding panels 220 and 222 may be locked in the closed position by a lock assembly 229. The lock assembly 229 is a cylinder lock that lies flush with the external surface of the second sliding panel 222 in this example. Similarly, a partial door lock assembly 243 may be provided on one or both of the first and second partial door panels 240 and 242 in the form of cylinder locks that are flush mounted. As noted above, the aesthetic appearance is enhanced by such flush mounting, but a small clearance (or gap) between the first and second partial door panels 240 and 242 may also be achieved by this arrangement. Additionally, by placing the lock assemblies 229 and 243 on the internal side only, the external side provides a uniformly clean and uninterrupted appearance that may be preferred by some business owners. In an example embodiment, a kitchen grade, stainless steel top cover 251 may be applied to a top of each of the first and second partial door panels 240 and 242.

The operation of the first and second sliding panels 220 and 222, and the first and second partial door panels 240 and 242 may be similar to that of the first and second sliding panels 120 and 122 and the first and second partial door panels 140 and 142 described above. Thus, a repeat of this functionality is not necessary, and will not be repeated. Nevertheless, in reference to FIG. 7, a transition of the first and second partial door panels 240 and 242 is shown to demonstrate how the first and second partial door panels 240 and 242 can be moved between the open and closed positions, and to an intermediate position, if desired. The various planes associated with the door assembly 200 are also shown in FIG. 7.

In this regard, FIG. 7 illustrates the first and second sliding panels 220 and 222 in the closed position. The first and second sidelites 210 and 212 lie in the common plane 271, and the first and second partial door panels 240 and 242 are also disposed in the common plane 271 when in the closed position. Meanwhile, the first and second sliding panels 220 and 222 lie in the second plane 273, which is parallel to the common plane 271. As shown in FIG. 7, the first and second partial door panels 240 and 242 can be manually swung (about continuous aluminum hinge 293) to an open position (demonstrated by dashed lines as first and second partial door panels 240' and 242'). Magnetic latches 279 are provided on the first and second sidelites 210 and 212 to retain the first and second partial door panels 240 and 242 in the open position. However, as noted above in reference to the more generic latch 180, it should be appreciated that magnetic latch 279 could be replaced with a spring loaded catch, or other latching mechanisms. In the depicted example, a distal end portion 299 of each of the first and second partial door panels 240 and 242 (relative to the continuous aluminum hinge 293) may be provided with a wider profile. The wider profile may increase the robustness of the first and second partial door panels 240 and 242, but may also provide additional spacing between the common plane 271 and the third plane 275.

In the open position, a maximum with of the door opening may be achieved, and the first and second partial door panels 240' and 242' may lie in a third plane 275 that is parallel to the common plane 271 and the second plane 273. However, it may also be the case that transitioning the first and second door panels 240 and 242 to a position that is not fully open is desired. As shown in FIG. 7, an intermediate positioning of the first and second partial door panels 240 and 242 to an intermediate position (demonstrated by dashed lines as first and second partial door panels 240" and 242") may also be achieved by corresponding manual positioning. In the intermediate position shown, the first and second partial door panels 240" and 242" are positioned to be substantially perpendicular to the common plane 271.

Although the examples of FIGS. 1-8 above show the partial door panels as half door panels, it is also possible for other structures to be employed. For example, FIGS. 9 and 10 illustrate an example in which the partial door panel has a C-shape. The structure and operation of the example of FIGS. 9 and 10 may be identical to that described above in reference to FIGS. 1-4 with the exception of the replacement of the first and second C-shaped partial door panels 340 and 342 for the first and second partial door panels 140 and 142 of FIGS. 1-4.

FIG. 9 shows the first and second sliding panels 120 and 122 in the open position, and the first and second C-shaped partial door panels 340 and 342 also in the open position. FIG. 10 shows the first and second C-shaped partial door panels 340 and 342 in the closed position, while the first and second sliding panels 120 and 122 remain in the open position. It should be appreciated that the first and second sliding panels 120 and 122 can also transition to the closed position shown in FIGS. 1 and 3 while the first and second C-shaped partial door panels 340 and 342 could be either in the open position of FIG. 9, or the closed position of FIG. 10. As can also be appreciated from FIGS. 9 and 10, the inclusion of the first and second C-shaped partial door panels 340 and 342 may define a smaller service window 343 area when the first and second C-shaped partial door panels 340 and 342 are in the closed position. The first and second C-shaped partial door panels 340 and 342 may be achieved by defining a frame member that extends along a full length of the first and second sidelites 120 and 122, respectively. A top portion of the frame member may then have an extension portion that extends substantially perpendicularly away from the frame member.

Accordingly, some example embodiments may provide a door assembly for use in a quick service, drive through, or other environment. The door assembly may include a first sidelite configured to be operably coupled to a first door jamb, a second sidelite configured to be operably coupled to a second door jamb where the first and second sidelites are disposed in a common plane and define a door opening between the first and second sidelites, a first sliding panel, a second sliding panel where the first and second sliding panels may be movable from a closed position disposing the first and second sliding panels to block access through the door opening and an open position in which the first sliding panel is proximate the first sidelite and the second sliding panel is proximate the second sidelite, a first partial door panel, and a second partial door panel. The first and second sliding panels may be disposed in a second plane parallel to the common plane in both the open and closed position. The first and second partial door panels may be operably coupled to the first and second sidelites, respectively, via hinge assemblies. The first and second partial door panels may have a closed state in which the first and second partial door panels are each disposed in the common plane blocking access through the door opening, and an open state in which the first and second partial door panels are each disposed out of the common plane (e.g., in a third plane parallel to each of the common plane and the second plane).

The door assembly and/or components thereof described above may be augmented or modified by altering individual features mentioned above or adding optional features. The augmentations or modifications may be performed in any combination and in any order. For example, in some cases, the first and second partial door panels may each have a height less than 50% of a height of the first and second sidelites. In an example embodiment, the first and second sliding panels may be automatically moved between the open position and the closed position based on a trigger provided from a motion sensor. In some cases, the first and second partial door panels may be manually movable between the open state and the closed state. In an example embodiment, the first and second partial door panels may be manually movable to an intermediate position between the open state and the closed state, and the intermediate position may include rotating the first and second partial door panels to be substantially perpendicular to the common plane. In some cases, a latch assembly may retain the first and second partial door panels proximate to the first and second sidelites, respectively, in the closed state. In an example embodiment, the latch assembly may include a magnetic latch disposed at each of the first and second sidelites to magnetically retain the first and second partial door panels proximate to the first and second sidelites, respectively. In some cases, the latch assembly may include a mechanical latch disposed at each of the first and second sidelites to engage a bracket on each of the first and second partial door panels, respectively. In an example embodiment, a first continuous hinge may operably couple the first partial door panel to the first sidelite, and a second continuous hinge may operably couple the second partial door panel to the second sidelite. In some cases, a pivot axis of each of the first and second continuous hinges may be disposed at an intersection of externally facing front faces of the first and second sidelites and the first and second partial door panels. In an example embodiment, the externally facing front faces of the first and second sidelites and the first and second partial door panels lie substantially in a same plane. In some cases, the first and second continuous hinges may each enable the first and second partial door panels, respectively, to swing 180 degrees between the closed state and the open state. In an example embodiment, a stainless steel cap may be disposed at a top portion of each of the first and second partial door panels. In some cases, the third plane is opposite the second plane with respect to the common plane. In an example embodiment, at least one of the first and second partial door panels may include a lock assembly thereon to lock the first and second partial door panels in the closed state. In some cases, the lock assembly may include a cylinder lock or lever bolt mounted substantially flush with a rear face of the first partial door panel or the second partial door panel. In an example embodiment, each of the first and second sidelites and the first and second sliding panels may include an opaque sub-panel and a transparent sub-panel. In some cases, the transparent sub-panel may be disposed above the opaque sub-panel. In an example embodiment, a width of the first and second sidelites may be approximately equal to a width of each of the first and second sliding panels and the first and second partial door panels. In some cases, the first and second partial door panels may each be substantially C-shaped.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A door assembly comprising:

a first sidelite configured to be operably coupled to a first door jamb of a building;

a second sidelite configured to be operably coupled to a second door jamb of the building, the first and second sidelites being disposed in a common plane and defining a door opening between the first and second sidelites extending from an exterior of the building to an interior of the building;

a first sliding panel disposed on an interior side of the first sidelite;

a second sliding panel disposed on the interior side of the second sidelite, the first and second sliding panels being movable from a closed position disposing the first and second sliding panels to block access through the door opening and an open position in which the first sliding panel is proximate the first sidelite and the second sliding panel is proximate the second sidelite, the first and second sliding panels being disposed in a second plane parallel to the common plane in both the open and closed position;

a first partial door panel having a partial height shorter than the first sidelite, and operably coupled to the first sidelite via a first hinge assembly; and a second partial door panel having the partial height, and operably coupled to the second sidelite via a second hinge assembly, wherein the first and second partial door panels have a closed state in which the first and second partial door panels are each disposed in the common plane blocking access through the door opening, and an open state in which the first and second partial door panels are each disposed out of the common plane on an exterior side of the building, and wherein the first and second partial door panels each extend only from ground level up to the partial height to define a portion of the door opening that remains open for passage of goods when the first and second sliding panels are in the open position.

2. The door assembly of claim 1, wherein the portion of the door opening is blocked by only the first and second sliding panels when the first and second sliding panels are in the closed position.

3. The door assembly of claim 1, wherein the first and second sliding panels are automatically moved between the open position and the closed position based on a trigger provided from a motion sensor.

4. The door assembly of claim 3, wherein the first and second partial door panels are manually movable between the open state and the closed state.

5. The door assembly of claim 4, wherein the first and second partial door panels are manually movable to an intermediate position between the open state and the closed state, the intermediate position including rotating the first and second partial door panels to be substantially perpendicular to the common plane.

6. The door assembly of claim 4, wherein a latch assembly retains the first and second partial door panels proximate to the first and second sidelites, respectively, in the opened state.

7. The door assembly of claim 6, wherein the latch assembly comprises a magnetic latch disposed at each of the first and second sidelites to magnetically retain the first and second partial door panels proximate to the first and second sidelites, respectively.

8. The door assembly of claim 6, wherein the latch assembly comprises a mechanical latch disposed at each of the first and second sidelites to engage a bracket on each of the first and second partial door panels, respectively.

9. The door assembly of claim 1, wherein a first continuous hinge operably couples the first partial door panel to the first sidelite, and a second continuous hinge operably couples the second partial door panel to the second sidelite.

10. The door assembly of claim 9, wherein a pivot axis of each of the first and second continuous hinges is disposed at an intersection of externally facing front faces of the first and second sidelites and the first and second partial door panels.

11. A door assembly comprising:

a first sidelite configured to be operably coupled to a first door jamb of a building;

a second sidelite configured to be operably coupled to a second door jamb of the building, the first and second sidelites being disposed in a common plane and defining a door opening between the first and second sidelites;

a first sliding panel;

a second sliding panel, the first and second sliding panels being movable from a closed position disposing the first and second sliding panels to block access through the door opening and an open position in which the first sliding panel is proximate the first sidelite and the second sliding panel is proximate the second sidelite, the first and second sliding panels being disposed in a second plane parallel to the common plane in both the open and closed position;

a first partial door panel having a partial height shorter than the first sidelite, and operably coupled to the first sidelite via a first hinge assembly; and a second partial door panel having the partial height, and operably coupled to the second sidelite via a second hinge assembly, wherein the first and second partial door panels have a closed state in which the first and second partial door panels are each disposed in the common plane blocking access through the door opening, and an open state in which the first and second partial door panels are each disposed out of the common plane, wherein the first and second partial door panels each extend only from ground level up to the partial height to define a portion of the door opening that remains open for passage of goods when the first and second sliding panels are in the open position, wherein the portion of the door opening is blocked by only the first and second sliding panels when the first and second sliding panels are in the closed position, wherein the door opening extends between an exterior of the building and an interior of the building, wherein the first and second sliding panels are on an interior side of the building relative to the common plane, and wherein the first and second partial doors are on the exterior side of the building relative to the common plane in the open state.

12. The door assembly of claim 11, wherein the first and second sliding panels are automatically moved between the open position and the closed position based on a trigger provided from a motion sensor.

13. The door assembly of claim 12, wherein the first and second partial door panels are manually movable between the open state and the closed state.

14. The door assembly of claim 13, wherein the first and second partial door panels are manually movable to an intermediate position between the open state and the closed state, the intermediate position including rotating the first and second partial door panels to be substantially perpendicular to the common plane.

15. The door assembly of claim 13, wherein a latch assembly retains the first and second partial door panels proximate to the first and second sidelites, respectively, in the opened state.

16. The door assembly of claim 11, wherein a first continuous hinge operably couples the first partial door panel to the first sidelite, and a second continuous hinge operably couples the second partial door panel to the second sidelite.

17. The door assembly of claim 16, wherein a pivot axis of each of the first and second continuous hinges is disposed at an intersection of externally facing front faces of the first and second sidelites and the first and second partial door panels.

18. The door assembly of claim 11, wherein at least one of the first and second partial door panels includes a lock assembly thereon to lock the first and second partial door panels in the closed state.

19. The door assembly of claim 18, wherein the lock assembly comprises a flush lever bolt or cylinder lock mounted flush with a rear face of the first partial door panel or the second partial door panel.

* * * * *